United States Patent [19]

Sakamoto et al.

[11] 4,070,694

[45] Jan. 24, 1978

[54] PICTURE IMAGE INFORMATION BAND COMPRESSION AND TRANSMISSION SYSTEM

[75] Inventors: Masaharu Sakamoto, Tokyo; Masahiro Aoki, Hachioji, both of Japan

[73] Assignee: Olympus Optical Company Limited, Tokyo, Japan

[21] Appl. No.: 643,383

[22] Filed: Dec. 22, 1975

[30] Foreign Application Priority Data

Dec. 24, 1974 Japan .................................. 49-1508

[51] Int. Cl.$^2$ ............................................. H04N 7/12
[52] U.S. Cl. ................................... 358/133; 358/138; 358/260; 358/261
[58] Field of Search .............. 178/DIG. 3, 6; 358/133, 358/138, 260, 261

[56] References Cited

U.S. PATENT DOCUMENTS

4,028,731   6/1977   Arps et al. ..................... 358/261

*Primary Examiner*—Robert L. Griffin
*Assistant Examiner*—Edward L. Coles
*Attorney, Agent, or Firm*—Haseltine, Lake & Waters

[57] ABSTRACT

A picture image information band compression and transmission process includes the steps of providing one set of three scanning lines making information of the first scanning line of each one set as an estimation scanning line, estimating a picture element to be estimated by four consecutive picture elements, preparing estimated picture image informations, and translating the estimation reference scanning line and two estimated picture image information into run length codes and into mode codes, respectively, and compressing and transmitting the run length codes.

10 Claims, 14 Drawing Figures

FIG. 1

→ Main Scanning Direction (A) o o ȯ ȯ ȯ o — — — o o o
     a b c (B) o o ȯ ȯ o o — — — o o o
     d e ↓ Auxiliary Scanning Direction

1 2 3 4 5 6 7 8 9 10 11 12 13 14 15 16 17 18 19 20
    ⎧ ⓐ' 0 0 0 0 0 0 0 0 0 0 0 0 0 0 0 0 0 0 0 0 ----
 B  ⎨ ⓑ' 0 1 0 0 0 1 0 0 0 0 0 0 1 1 0 1 1 0 0 0 ----
    ⎩ ⓒ' 0 0 0 0 0 1 1 0 0 0 0 0 0 0 0 1 0 0 0 0 ----
Mode
Number  |1|3|1| 1| 1|4|2|1| 1| 1| 1| 1|3|3|1|4|3|1| 1| 1| ----
Coded ⓑ'ⓒ'|0|10|0 0 0|11|00|0 0 0 0 0 1|10|10|0|11|10|0 0 0|
```

```
    ⎧ ⓐ" 0 0 0 0 0 1 0 0 0 0 0 0
 C  ⎨ ⓑ" 0 1 0 1 0 0 0 1 1 1 0 0 0 0 0 0 0 0 1 1 0 1 ←
    ⎩           ← 1 0 1 0 1 1 1 0 1 0 0 0
```

FIG.7 Estimation Circuit

FIG.8
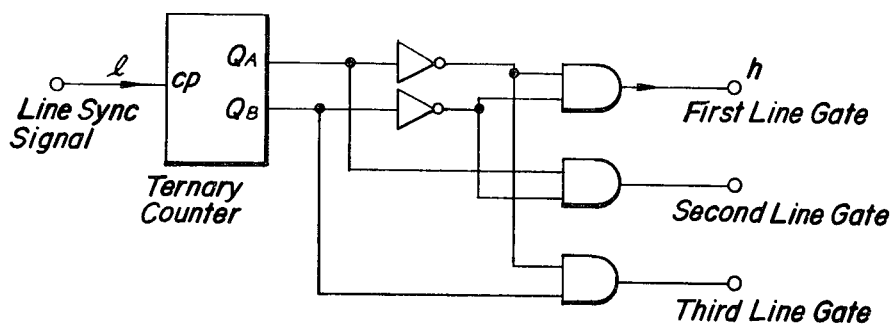
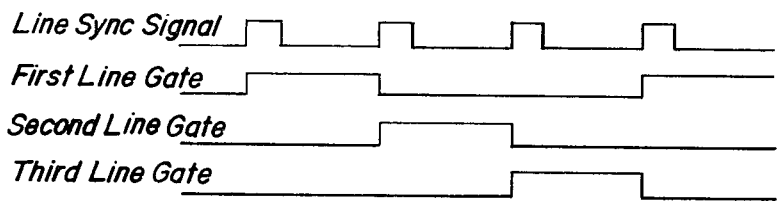
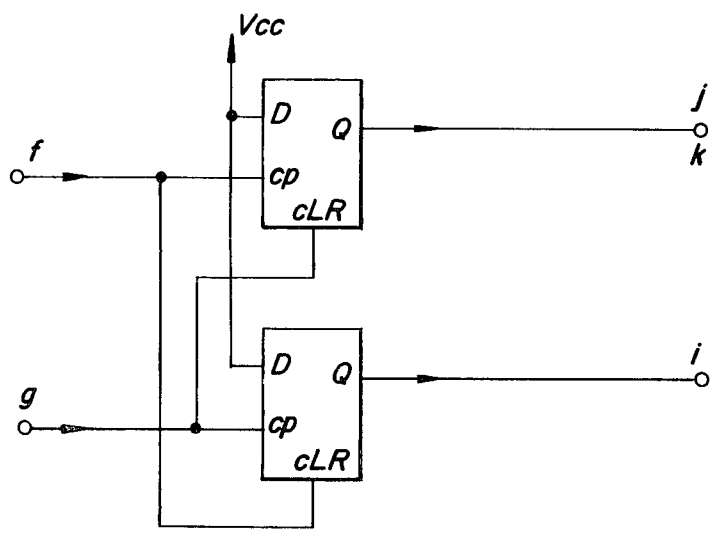

Generator for Generating P Pulse for Shift Pulse Completion

FIG_12

Effective Figure Number Setting Circuit

Changing Point Delector Flug F/F

PICTURE IMAGE INFORMATION BAND COMPRESSION AND TRANSMISSION SYSTEM

This invention relates to a picture image information band compression and transmission system in which two dimensional picture images such as a facsimile and the like are scanned to obtain a scanned picture image information which is then changed into a new picture image (hereinafter will be called as an estimated picture image information) with the aid of an estimation logic system for the purpose of increasing correlation between picture elements in an auxiliary scanning direction perpendicular to a main scanning direction and at least one set composed of several scanning lines of the estimated picture image information in the auxiliary scanning direction is translated into codes and the codes are transmitted, and which can provide a transmission band usable in a high efficiency.

As such band compression system, it might be considered to provide a system which makes use of an increased correlation between picture elements in the main scanning direction so as to compress its redundancy, i.e. compress that part of a transmission path which can be eliminated without loss of essential information. Heretofore, it has been well known to provide a run length coded system in which a consecutive number of white or black of the picture image information in the main scanning direction is translated into codes so as to compress its redundancy and then the codes are transmitted.

It has also been well known to provide a two dimensional estimation system which makes use of both a correlation between picture elements of the scanned picture image information in the main scanning direction and a correlation between picture elements in the auxiliary scanning direction, that is, a system which makes use of picture image information a, b, c of the first scanning line shown in FIG. 1A and a picture element d immediately before an input e shown in FIG. 1B for the purpose of estimating the input e. In this conventional system, if the input e coincides with an estimated value, a new estimated picture image information "0" is given and if the input e does not coincide with the estimated value, another new estimated picture image information "1" is given. That is, a system in which the estimated picture image information thus given every one scanning line is translated into a run length code which is then transmitted. That is, this conventional system makes use of both the run length coded system and the two dimensional estimation system so as to compress the redundancy of the transmission path.

An object of the invention is to provide a picture image information band compression and transmission system which makes use of an estimation logic system, that is, a two dimensional estimation system, and which can select the estimation function such that the correlation between the picture elements of the estimated picture image information in the auxiliary scanning direction becomes significantly stronger than the correlation between the scanned picture image information in the auxiliary scanning direction.

Another object of the invention is to provide a picture image information band compression and transmission system which makes use of a combination of those picture element informations of the estimated picture image information which are located at the same one position corresponding to each scanning line so as to translate them into mode codes or run length codes, whereby one set of several scanning lines is transmitted.

A feature of the invention is the provision of a picture image information band compression and transmission system comprising providing at least one set of scanning lines, from successive scanning lines in an auxiliary scanning direction perpendicular to a main scanning direction making informations of a first scanning line of each one set as an estimation reference information, preparing an estimated picture image information by estimating on the basis of that picture image information which precedes a picture image information to be estimated with respect to scanning lines succeeding to said first scanning line, and translating said estimated reference information located on said first scanning line into a run length code and compressing said estimated reference information, while translating said estimated picture image information into a mode code and compressing said estimated picture image information, and transmitting both said compressed estimated reference information and said compressed estimated picture image information.

The invention will now be described in greater detail with reference to the accompanying drawings, wherein:

FIGS. 1(A) and 1(B) are diagrammatic illustrations of one example of an estimation system applicable to the picture image information band compression and transmission system according to the invention;

FIG. 2 is a table for explaining the operation of the picture image information band compression and transmission system according to the invention;

FIGS. 6 to 14 are circuit diagrams showing circuit elements usable for the transmitting device shown in FIG. 3.

Figure 3:
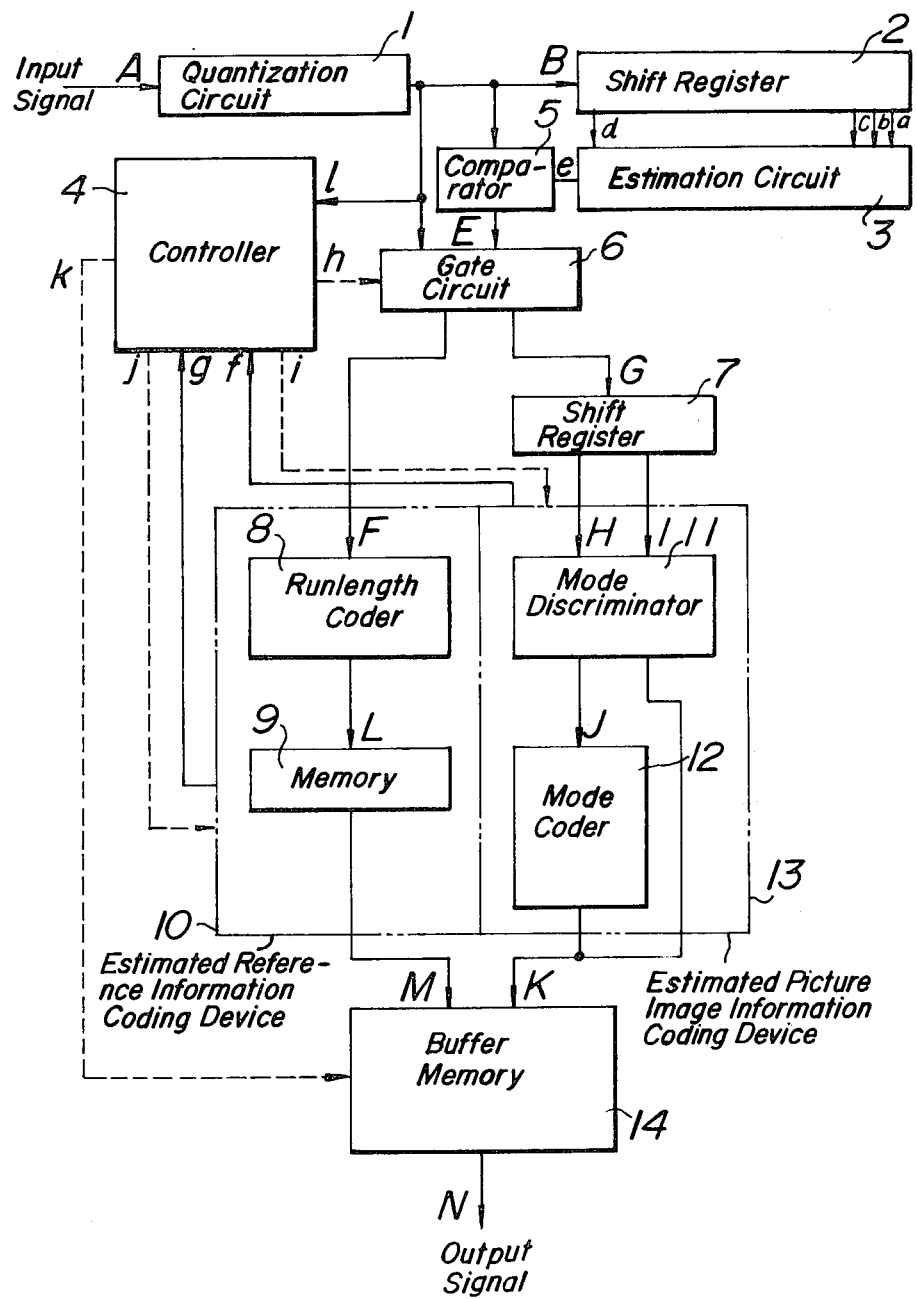
FIG. 3 is a block diagram showing one embodiment of a transmitting device usable for the picture image information band compression and transmission system according to the invention.

In FIG. 2 are shown steps of changing picture image informations into codes illustrating the operation of the band compression and transmission system according to the invention.

FIG. 2A shows a binary picture image information provided by scanning a printed matter and composed of a series of two dimensional codes in which white and black signals are represented by "0" and "1", respectively, where three scanning lines are designated by ⓐ, ⓑ and ⓒ, respectively.

In FIG. 2B are shown estimated picture image informations provided by estimating the input e from the two dimensional codes of three scanning lines shown in FIG. 2A with the aid of a combination of four picture elements composed of the informations a, b, c located on a first scanning line shown in FIG. 1(A) and the picture element d located on a second scanning line following the first scanning line and situated immediately below the picture element b and directly ahead of the input e as shown in FIG. 1(B), "0" designating a coincidence between the estimated value and the scanned picture image information and "1" designating a lack of coincidence therebetween.

An estimation function is a function determined by a probability of appearance of the input e with respect to the four picture elements of the scanned picture image information a, b, c, d shown in the following Table 1.

This value of e, as shown in Table 1 below, has been obtained statistically, e being given by $e = (\bar{a} + ab + a\bar{b}c)d + \bar{a}bc$.

Table 1

| Consecutive picture element | Estimated value | Consecutive picture element | Estimated value |
|---|---|---|---|
| abcd | e | abcd | e |
| 0000 | 0 | 1000 | 0 |
| 0001 | 1 | 1001 | 0 |
| 0010 | 0 | 1010 | 0 |
| 0011 | 1 | 1011 | 1 |
| 0100 | 0 | 1100 | 0 |
| 0101 | 1 | 1101 | 1 |
| 0110 | 1 | 1110 | 0 |
| 0111 | 1 | 1111 | 1 |

Note:
0 is a white signal
1 is a black signal

As shown in FIG. 1, the invention makes use of picture elements a, b, c of first scanning line and of a picture element d immediately before a picture element e to be estimated of second scanning line B for the purpose of estimating the picture element e with the aid of the result statistically obtained beforehand. The picture element e thus estimated is compared with an actual picture element e. If the picture element e thus estimated coincides with the actual picture element e, "0" is obtained. If the picture element e thus estimated does not coincide with the practical picture element e, "1" is obtained. In this way, the second scanning line B can be successively estimated to form a new picture image information.

Note that "a, b, c, d" shown in Table 1, are not consecutive picture elements. "a, b, c" belong to first scanning line, while "d" belongs to second scanning line B as shown in FIG. 1. "d, e" belong to the second scanning line.

Table 1 shows the result of probability that "e" becomes "1" or becomes "0" with respect to a combination of the four picture elements "a, b, c, d", the result of probability being statistically obtained from a typical manuscript used in practice by means of a mini-computer. That information of e which has a high probability of appearing as a "1" or a "0" is made an estimated value.

As an example, ⓑ2 shown in FIG. 2A is estimated by means of four consecutive picture elements a, b, c, d. That is, the estimating picture elements a, b, c, d are "0" at the picture element information ⓐ1 corresponding to the picture element a, are "0" at the picture element information ⓐ2 corresponding to the picture element b, are "0" at the picture element information ⓐ3 corresponding to the picture element c, and are "0" at the picture element information ⓑ1 corresponding to the picture element d. As a result, the four estimating picture elements a, b, c, d become 0000.

From the Table 1, the estimated value e is "0". But, the input picture element information ⓑ2 is "1", so that ⓑ2 does not coincide with the estimated value "0". Hence, ⓑ'2 is made "1" due to lack of coincidence.

Twenty bits shown in FIG. 2A will now be estimated. The series of informations ⓐ shown in FIG. 2A is used as a reference line ⓐ' for estimation shown in FIG. 2B. An estimated picture image information estimated in dependence on the estimation function shown in the Table 1 by means of the two lines ⓐⓑ and shown in FIG. 2A is the line ⓑ' shown in FIG. 2B. That is, in order to estimate ⓑ, b, c of the scanned picture image information a, b, c, d is 0, 0 being the informations of ⓐ1 and ⓐ2, respectively and assume that a, d are not determined. In such a case, since in general the frame of the original picture has a preponderance of white picture elements or pixels, let a, and d be 0, 0, respectively. Then a, b, c, d become 0, 0, 0, 0, respectively. The estimation function then causes the estimated value e to take 0. This estimated value e coincides with the picture image information ⓑ1, so that ⓑ' 1 becomes 0. Let a b c d be 0, 0, 0, 0 and let the estimated value e be 0, then the picture image information ⓑ2 is 1, so that ⓑ2 does not coincide with the estimated value and hence ⓑ' 2 becomes "1". Let the estimated picture element a b c d be 0, 0, 0 1 and let the estimated value e be "1", so that ⓑ 3 coincides with the estimated value e and hence ⓑ' 3 becomes "0".

In a similar way ⓑ 3 is estimated. As shown in FIG. 2A, the consecutive picture elements a, b, c, d are "0" at a =ⓐ2, are "0" at b = ⓐ3, are "0" at cⓐ4 and "1" at d =ⓑ2, so that the consecutive picture elements a, b, c, d are 0001. From the estimation function Table 1, the estimated value e is given by e = "1". This estimated value of e = "1" of the input signal ⓑ 3, so that ⓑ '3 becomes "0".

In a similar manner, if ⓑ4 to ⓑ 20 are estimated; coincidence of noncoincidence of the estimated values of e with the information of the input signals are determined to represent these by "0" and "1", respectively. As a result, ⓑ '4 to ⓑ '20 can be represented by "0", "1" by 00100000011011000 as shown in FIG. 2B. Hence B ⓑ becomes 01000100000011011000 as shown in FIG. 2B.

Similarly in the four consecutive picture elements a, b, c, d for estimating ⓒ1 shown in FIG. 2A, b, c, are "0" at the picture information b = ⓑ 1 and are "1" at the picture information c = ⓑ2. As a result, the information corresponding to the estimating picture elements a, d are absent. So, in the similar way as in the case of estimating ⓑ 1, estimation is effected by assuming a, d be 0, 0, respectively. This is because of the fact that the frame of the original picture has a preponderance of white, so that a, d can be assumed to be "0." Thus, the four consecutive picture elements a, b, c, d become 0010. From the Table 1, the estimated value of e is "0" and coincides with the information "0" of the input picture element ⓒ 1. As a result, ⓒ '1 is "0."

In the case of estimating ⓑ 10 shown in FIG. 2A, a serves to sample ⓐ9, b serves to sample ⓐ10, c serves to sample ⓐ11 and d serves to sample ⓑ9. In this case, a b c d becomes 0000. From the Table 1, the estimated value e becomes "0." As shown in FIG. 2A, ⓑ 10 is "0" and coincides with the estimated value e of "0," so that ⓑ'10 becomes 0 as shown in FIG. 2B.

As to ⓒ' 2, the four consecutive picture elements are 0110, so that from the Table 1 the estimated value e is "1" which coincides with the picture image information, and hence ⓒ' 2 is "0". As to ⓒ' 3, the four consecutive picture elements are 1111, so that from the Table 1 the estimated value e is 1 which concides with the picture image information, and hence ⓒ' 3 is "0".

In similar manner, if ⓒ '4 to ⓒ '20 are estimated, ⓒ' shown in FIG. 2B becomes 00000 11000 00000 10000.

The picture image information ⓐ' shown in FIG. 2B is composed of the scanned picture image information ⓐ shown in FIG. 2A and constitutes an estimated reference information for the estimated picture image informations ⓑ' ⓒ' which will be translated as one set into codes. In the specification, the picture image information ⓐ' shown in FIG. 2B will be called an estimated reference information. By adding this estimated reference information ahead of one set of estimated picture image informations or pixels to be simultaneously translated into codes, it is possible to obviate the disadvantage that an error produced in the transmission path remains not only in one scanning line but also in the succeeding scanning lines, which has been encountered in conventional estimation logic systems. That is, the system according to the invention, has the advantage that it can absorb the error within one set of estimated picture image information without introducing an error into the other sets of estimated picture image informations.

The series of informations ⓐ' shown in FIG. 2B are translated into run length codes and these codes are then transmitted. "Run length" is the number of picture elements. The run length is a length composed of consecutive white picture elements or of consecutive black picture elements.

Consecutive white picture elements or consecutive black picture elements appearing in succession during one scanning line are translated into run length codes in succession in every one picture element and every black picture element. In order to make the redundancy high, it is necessary for "0" or "1" to be consecutive as long as possible. For this purpose, one scanning line is estimated so that the estimated information coincides with the actual information, if possible, so as to make the consecutive sequence of "0"s long.

In facsimile signals, the smaller the number of run lengths, the higher is the frequency of occurrence of the run length. As a result, run length codes shown in the following Tables 2 and 3 are used as a coding means. One run length shows the number of consecutive white or black picture elements.

Table 2 shows codes translated from the number of run length of white information elements, that is, the number of consecutive white picture elements.

Table 3 shows codes translated from the number of run length of the black information elements, that is, the number of consecutive black picture elements.

There are many coding systems. In general, the SHANNON FANO coding system has been used.

If $1 \leq n \leq 3$, the run length can be expressed by "$n$".

If $n \geq 4$, the run length can be expressed by the ($n - 4$) theorem.

Table 2

| Number of run lengths n (pixels) | Code | | | | | | | | | | | | | | | | Number of bits |
|---|---|---|---|---|---|---|---|---|---|---|---|---|---|---|---|---|---|
| 1 | | | | | | | | | | | | | | | | 0 | 1 |
| 2 | | | | | | | | | | | | | | | 0 | 0 | 2 |
| 3 in code | | | | | | | | | | | | | | 0 | 0 | 0 | 3 |
| 4 | | | | | | | | | | | 0 | 0 | 0 | ⓞ | 0 | 0 | 6 |
| 5 | | | | | | | | | | | 0 | 0 | 0 | ⓞ | 0 | 1 | 6 |
| ∫ | | | | | | | | | | | | | ∫ | | | | |
| 8 | | | | | | | | 0 | 0 | 0 | ⓞ | 0 | 1 | ⓞ | 0 | 0 | 9 |
| ∫ | | | | | | | | | | | | | ∫ | | | | |
| 12 | | | | | | | | 0 | 0 | 0 | ⓞ | 1 | 0 | ⓞ | 0 | 0 | 9 |
| ∫ | | | | | | | | | | | | | ∫ | | | | |
| 20 | | | | | 0 | 0 | 0 | ⓞ | 0 | 1 | ⓞ | 0 | 0 | ⓞ | 0 | 0 | 12 |
| ∫ | | | | | | | | | | | | | ∫ | | | | |
| 1024 | 0 | 0 | 0 | ⓞ | 1 | 1 | ⓞ | 1 | 1 | ⓞ | 1 | 1 | ⓞ | 1 | 1 | ⓞ | 0 | 0 | 18 |

For example 000ⓞ01 is a run length $(5)_{10}$; if the run length $n$ is larger than 4, $(5)_{10} - (4)_{10} = (1)_{10}$. This $(1)_{10}$ is translated into a binary code. If this binary code is represented by a set of two bits, this binary code is given by 01. Ahead of 01 there is added the information signal "0" of the white information elements every two bits to obtain ⓞ01. ⓞ designates a bit for showing the run length code including ⓞ as a white information. In Table 3, ① designates a bit for showing the run length code including ① as a black information. Ahead of ⓞ01 there are added three bits representing the run length 1 to 3 to obtain 000ⓞ01.

It should be noted that the sequence 1101 belongs to a processing step which is entirely different from a processing step where the ($n - 4$) theorem is applicable.

The sequence 1101 can estimate $e$ with the aid of Table 1. The picture element $e$ thus estimated is compared with an actual "$e$" information.

If the picture element $e$ thus estimated coincides with the actual $e$ information, "0" is obtained.

If the picture element $e$ thus estimated does not coincide with the actual $e$ information, "1" is obtained.

The number "$n$" made up of consecutive "0" or "1" picture element is translated into the run length codes as shown in the Tables 2 and 3, respectively.

Tables 2 and 3 are considered to show a simple code which corresponds to each of the run lengths.

Table 3

| Number of run length n | Code | | | | | | | | | | | | | | | Number of bits |
|---|---|---|---|---|---|---|---|---|---|---|---|---|---|---|---|---|
| 1 | | | | | | | | | | | | | | 1 | 1 | 1 |
| 2 | | | | | | | | | | | | | 1 | 1 | 1 | 2 |
| 3 | | | | | | | | | | | | 1 | 1 | 1 | 1 | 3 |
| 4 | | | | | | | | 1 | 1 | 1 | ① | 0 | 0 | | | 6 |
| 5 | | | | | | | | 1 | 1 | 1 | ① | 0 | 1 | | | 6 |
| ʃ | | | | | | | | | | ʃ | | | | | | |
| 8 | | | | | | 1 | 1 | 1 | ① | 0 | 1 | ① | 0 | 0 | | 9 |
| ʃ | | | | | | | | | | ʃ | | | | | | |
| 12 | | | | | | 1 | 1 | 1 | ① | 1 | 0 | ① | 0 | 0 | | 9 |
| ʃ | | | | | | | | | | ʃ | | | | | | |
| 20 | | | | 1 | 1 | 1 | ① | 0 | 1 | ① | 0 | 0 | ① | 0 | 0 | 12 |
| ʃ | | | | | | | | | | ʃ | | | | | | |
| 1024 | 1 | 1 | 1 | ① | 1 | 1 | ① | 1 | 1 | ① | 1 | 1 | ① | 1 | .1 | ① | 0 | 0 | 18 |

If the run length n lies between 1 to 3, the information signals "0" of the white information elements, and the information signals "1" of the black information elements, which equal the run length n, are added. If the run length n is at least 4, use is made of the (n−4) theorem and this value of n−4 is translated into a binary code which is divided into two bit unit. In the case of the white signal, "0" is added to every divided unit, while in the case of the black signal "1" is added to every divided unit. For example, let the run length of the white information be 14, then use is made of 14−4=10. This means that the white information elements which appear during one scanning line are 14 picture elements which are translated into the run length code as shown in Table 2. Before and after such 14 white information picture elements, there occur consecutive black information picture elements composed of a plurality of picture elements. These black information picture elements are translated into the run length code as shown in FIG. 3. Therefore, the value of 10 is translated into a simple binary code 1010 which is divided into two bit unit 10, and 10. In the case of the white signal, the information signal "0" of the white information is added ahead of each divided unit to yield ① 1 0 ① 1 0. Ahead of this code are added three bits representing the run length 1 to 3 to yield 0 0 0 ① 1 0 ① 1 0. In this coding process, a simple binary code may be arranged from a lower figure according to the circuit design.

In the above example, the binary code 1010 becomes 0101, so that the run length code becomes 0 0 0 ① 0 1 ① 0 1.

If the code shown in FIG. 2 is applied, since ⓐ' is composed of 20 consecutive bits of "0", the run length is 20. That is, the run length 20 is translated into a code 0 0 0 ① 0 1 ① 0 0 ① 0 0 as shown by ⓐ" in FIG. 2C and then this code is transmitted.

As a system of simultaneously translating the two lines of the estimated picture image information shown by ⓑ' ⓒ' in FIG. 2B into codes and transmitting these codes, provision may be made of a system composed of two picture elements of two dimensional codes of consecutive white and/or black information elements in the auxiliary scanning direction as shown in the following Table 4.

In Table 4, the column of Mode code of Mode No. 1, there is described that "Run length code which makes use of "0." This means that it is necessary to always use "0" ahead of the run length code for the purpose of discriminating such a run length code from the run length codes using 10, 11 including a "1" prior to the start thereof in the modes No. 2, 3, 4. That is, the run length code which makes use of "0" is not a code represented by "0" only, but is a code in which the start of the run length code is always begun from "0"; for example, this is the case for the run length codes shown in Table 2.

Table 4

| Mode No. | Two lines picture element | Mode code | Code to be added |
|---|---|---|---|
| 1 | 0<br>0<br>0 | Run length code which makes use of "0" | Run length code |
| 2 | • • | 10 | 0 |
| 3 | 0<br>• | 10 | 1 |
| 4 | • | 11 | None |

In the above Table 4, the probability of continuously appearing the mode 1 composed of the two lines picture elements 0 0 is so large that use is made of the run length code which makes use of "0", for example, the code shown in the Table 2 for the purpose of compressing the redundancy of the transmission path.

In the above Table 4, the modes 2 and 3 are those conditions in which the two consecutive picture element in the two scanning lines in the auxiliary scanning direction are different from each other. That is, in the mode 2 one scanning line picture element is white and the other scanning line picture element is black, while in the mode 3 one scanning line picture element is black and the other scanning line picture element is white.

As the mode code, 10 is obtained when the picture element of the preceding scanning line is white, and "0"

is added, while when the picture element of the preceding scanning line is black, "1" is added. When the two lines picture elements are o •, three bits 100 are used to represent them (mode 2). When the two lines picture elements are • o , three bits 101 are used to represent them (mode 3).

The mode 4 is that condition in which two black picture elements • • are present in the two scanning lines and the information elements of which coincide with each other. But, the estimated picture image information is concentrated into that code which has a shorter black run length by estimation, thus resulting in an increase of isolation points. In addition, in the case of scanning overall surface of an original picture of A4 size, an average changing point from black to white and white to black on one scanning line of the estimated picture image information is decreased by on the order of 25 to 40% if compared with that of the scanned picture image information. As a result, the two lines picture elements • • are not translated into run length codes, but allotted the 11 code.

By taking the above mentioned mode code into consideration, the two scanning lines ⓑ' and ⓒ' shown in FIG. 2B are treated. Both ⓑ' 1 and ⓒ' 1 coincide with each other with respect to "0" and hence become the run length code 0. ⓑ' 2 and ⓒ' 2 do not coincide and hence become the mode code 10 added with the code 1 due to the fact that the information ⓑ' 2 is 1, that is becomes the run length code 101. Each of ⓑ' 3 ⓒ' 3 to ⓑ' 5 ⓒ' 5 coincides with each other with respect to "0" and hence becomes the run length code 000. ⓑ' 6 and ⓒ' 6 coincide with each other with respect to "1" and hence become the run length code 11. ⓑ' 7 and ⓒ' 7 correspond to the mode No. 2 in the Table 4 and hence become the run length code 100. In FIG. 2B, ⓑ'7 and ⓒ 7 are "0" and "1" respectively, so that they coincide with the mode No. 2 in the Table 4. Thus, they are translated into a run length code 100 by adding 37 0" to the end of the mode code 10. Each of ⓑ' 8 ⓒ' 8 to ⓑ' 12 ⓒ' 12 corresponds to the mode No. 1 in the Table 4 and hence becomes the run length code 0 0 0 ⓪ 0 1. Each of ⓑ' 13 ⓒ' 13 and ⓑ' 14 ⓒ' 14 corresponds to the mode No. 3 in the Table 4 and hence becomes the run length 101. ⓑ' 15 and ⓒ' 15 correspond to the mode No. 1 in the Table 4 and hence become the run length code 0. ⓑ' 16 and ⓒ' 16 correspond to the mode No. 4 and hence become the run length code 11. ⓑ' 17 and ⓒ' 17 correspond to the mode No. 3 in the Table 4 and hence become the run length code 101. Each of ⓑ' ⓒ' 18 to ⓑ' ⓒ' 20 corresponds to the mode No. 1 in the Table 4 and hence becomes the run length code 000. As a result, the signal to be transmitted becomes 0 1 0 1 0 0 0 1 1 1 0 0 0 0 0 0 1 1 0 1 1 0 1 0 1 1 1 0 1 0 0 0 as shown by ⓑ" in FIG. 2C.

As seen from the above, the system according to the invention is capable of translating each 20 bits of the scanned picture image informations of the 3 scanning lines into the codes ⓐ ", ⓑ " shown in FIG. 2C and transmitting these codes into the transmission path. In this manner, the system according to the invention can significantly compress the transmission band.

In FIG. 3 there is shown one embodiment of a transmitting device usable for the system according to the invention for the purpose of translating an input signal into a code and transmitting it. In FIG. 3, A designates a scanned analog signal which is supplied as an input signal to a quantization circuit 1 which can translate the signal A into a binary code signal B composed of "1" corresponding to the black information, and "0" corresponding to the white information. The present transmitting device comprises a shift register 2 connected to the quantization circuit 1 and for storing the picture elements contained in one scanning line, an estimation circuit 3 connected to the shift register 2, a controller 4 connected to parts of the transmitting device inclusive of the quantization circuit 1 and the shift register 2 and for controlling these parts, a comparator 5 connected to the quantization circuit 1, a shift register 2 and estimation circuit 3 and including an exclusive logic sum circuit, a gate circuit 6 connected to the quantization circuit 1, shift register 2, controller 4 and comparator 5 and for selecting either one of its two input signals and delivering one of selected signals, a shift register 7 connected to the gate circuit 6 and for temporarily storing that estimated picture image information which has passed the gate circuit 6, a coder 8 connected to the gate circuit 6 and translating the first scanning line into a run length code, a memory 9 connected to the run length coder 8 and temporarily storing the run length code translated by the coder 8, an estimated reference information coding device 10 including the coder 8 and the memory 9, and for translating the first scanning line of the estimated reference information into the run length code, a discriminator 11 connected to the shift register 7 and selecting one of the modes shown in the Table 4 to generate a mode code, a coder 12 connected to the mode discriminator 11 and translating the mode shown in the Table 4 into a run length code, an estimated picture image information coding device 13 including the discriminator 11 and the coder 12 and translating both the succeeding two scanning lines of the estimated picture image information into codes, and a buffer memory 14 connected to the coding devices 10, 13 and transmitting an output signal to a transmission path.

As described above, the scanned picture image information A is translated by the quantization circuit 1 into the binary signal B composed of "1" and "0" which is then supplied in succession to the shift register 2. If the first scanning line of the input binary signal B is an estimated reference signal, the gate circuit 6 causes the binary signal B to be changed over to a signal F which is continuously supplied to the coding device 10. If the controller 4 detects a synchronizing signal of one scanning line by the signal e, a control instruction h is delivered to the gate circuit 6 to effect its change-over operation, thereby supplying all of the picture elements of the first scanning line to the coding device 10.

The shift register 2 has such a capacity that it can store all of the picture elements of one scanning line of the binary signal B. As a result, if the binary signal B is supplied to the shift register 2, the three picture elements a, b, c, which correspond to the three picture elements of the scanning line shown in FIG. 1A and the picture element d composed of the input signal B are supplied to the estimation circuit 3 in which these four picture elements serve to effect estimation. A signal thus estimated is supplied to the comparator 5 including the exclusive logic sum circuit.

As seen from the above, the signal B is accumulated in the shift register 2 which constitutes a memory for one scanning line and at the same time is compared in the comparator 5 with the output from the estimation circuit 3. An output E from the comparator 5 is supplied to the gate circuit 6.

In the comparator 5, if the estimated signal coincides with the binary signal B, there is produced an estimated picture image information "0", while if the estimated signal does not coincide with the binary signal B, there is produced an estimated picture image information "1". If all of the picture elements of the estimated reference scanning line are supplied to the coding device 10, the gate circuit 6 causes an estimated picture image information E to pass therethrough so as to store the estimated picture image information elements of the two scanning lines in the shift register 7.

That is, if the controller 4 counts a synchronizing signal *l* of the scanned picture image information and delivers a control instruction *h* to the gate circuit 6, the gate circuit 6 serves to alternately supply the first estimated reference scanning line to the coding device 10 and to supply the estimated picture image information of the succeeding two scanning lines to the shift register 7. The estimated reference information supplied to the coding device 10 is translated by the coder 8 into the run length codes shown in the Tables 2 and 3 and these run length codes are temporarily stored in the memory 9. The controller 4 receives an instruction *f* from the coding device 13 that both the coding and transferring operations have been completed and then delivers an instruction *k* to the buffer memory 14 and a transfer instruction *j* to the cooling device 10. As a result, the memory 9 serves to transfer one scanning line code inclusive of the synchronizing code to the buffer memory 14. The coding device 10 delivers an instruction *g* to the controller 4 that the transfer has been completed.

This means that the transfer of the first scanning line for the estimated reference information has been completed. The controller 4 after having received the instruction *g* that the transfer of the data has been completed delivers an instruction *i* to the coding device 13 that its operation should be started.

The coding device 13 receives two picture elements H, I in parallel from the head information of each scanning line of the succeeding two scanning lines of the estimated picture image information accumulated in the shift register 7 every time the picture element corresponding to the succeeding two scanning lines in the auxiliary direction is present. The mode discriminator 11 judges a combination of these two picture elements. If the mode 1 is present, a pulse J is supplied to the mode coder 12 that counts the number of pulses J. The mode coder 12 after having received a mode changing signal translates the counted value into a code K which is delivered to the buffer memory 14. If the modes 2, 3, 4 are present, the mode disciminator 11 serves to supply a mode code 100, 101, 11 to the buffer memory 14, respectively. If all of the succeeding two scanning lines of the estimated picture image information have been translated into codes and the transfer of these codes has been completed, a synchronizing code is delivered and the coding device 13 serves to supply an instruction *f* to the controller 4 that the transfer has been completed to cause it to effect its next operation. In this manner, the controller 4 alternately controls the gate circuit 6 and coding devices 10, 13 in a smooth manner.

If the coding device 13 is so designed that it can effect its coding operation within a bit cycle of the picture element of the estimated picture image information, it is possible to reduce the capacity of the shift registor 7 by the number of the picture elements of one scanning line.

Figure 4:
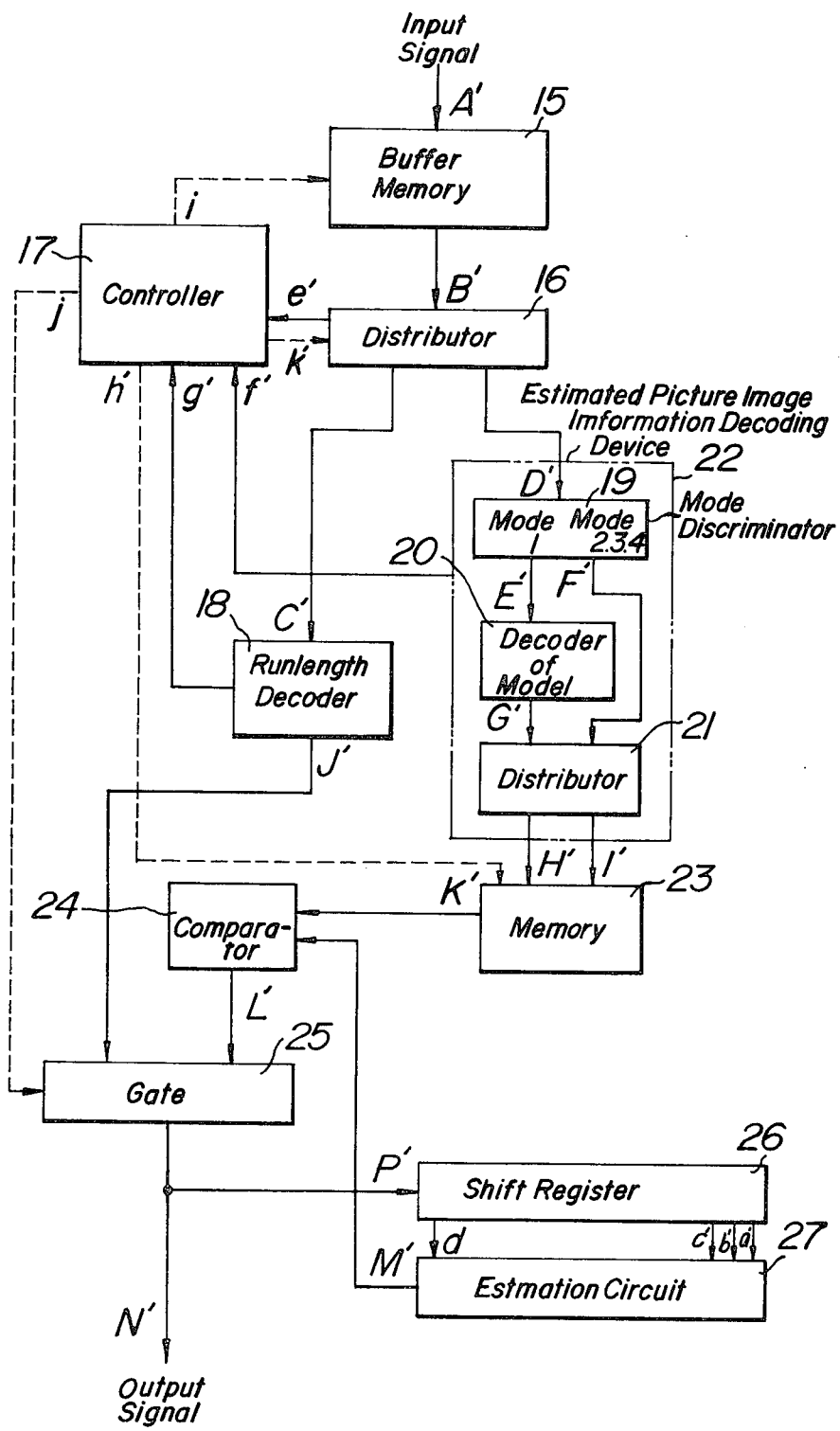
FIG. 4 is a block diagram showing one embodiment of a receiving device adapted to be cooperated with the transmitting device shown in FIG. 3.

In FIG. 4 is shown one embodiment of a receiving device which can operate in association with the transmitting device shown in FIG. 3. The present receiving device comprises a buffer memory 15, a distributor 16 connected to buffer memory 15 and separating the estimated reference information from the estimated picture image information, a controller 17 connected to the buffer memory 15, distributor 16 and the other parts of the receiving device and for controlling these parts of the receiving device, a decoder 18 connected to the distributor 16 and controller 17 and for decoding the estimated reference information, a discriminator 19 connected to the distributor 16, a decoder 20 of mode 1 connected to the discriminator 19, a distributor 21 connected to the decoder 20 of mode 1 and discriminator 19 and for distributing the information of the succeeding two scanning lines into two scanning lines H', I' of the estimated picture image information, an estimated picture image information decoding device 22 including the discriminator 19, decoder 20 and distributor 21 and for decoding the code information of the succeeding two scanning lines, a memory 23 connected to the distributor 21 and having a capacity which corresponds to the number of picture elements of the succeeding two scanning lines and for temporarily storing the decoded estimated picture image information, a comparator 24 connected to the memory 23 and composed of an exclusive logic sum and for separating the estimated picture image information, a gate 25 connected to the comparator 24 and decoder 18, a shift register 26 connected to the gate 25 and having a capacity that can store the number of the picture elements of one scanning line, and an estimation circuit 27 connected to the comparator 24 and the shift register 26.

The coded input signal transmitted from the transmitting side, that is, a compressed signal A' is stored in the buffer memory 15. The buffer memory 15 receives an instruction *i'* from the controller 17 and supplies one bit B' of the compressed signal B' to the distributor 16. The distributor 16 serves to judge whether or not the series of synchronizing codes is present every time the B' signal arrives thereat and in addition divides the B' signal into two signals C' and D' and distributes these signals to the decoder 18 and the decoding device 22, respectively. The decoder 18 causes the signal C' delivered from the distributor 16 to be decoded into one set of three bits and if necessary, delivers an instruction *g'* to the controller 17, which after an elapse of time delivers an instruction *i'* to the buffer memory 15 which is read out one bit of the compressed signal.

In this manner, the estimated reference information decoded by the decoder 18 passes in succession through the gate 25 every time an instruction *j'* from the controller 17 arrives at the gate 25 and is delivered therefrom as an output signal N' to a recording apparatus and the like.

At the same time, the output signal N' is delivered as a signal P' to the shift register 26 and stored therein in succession.

The distributor 16, upon detection of the series of synchronizing codes, delivers a signal *e'* to the controller 17 and delivers a synchronizing code detected instruction *c'* to the decoder 18 so as to instruct the fact that the first scanning line of the estimated reference compressed signal ends, and stores the fact that succeeding compressed signals should be transferred to the decoding device 22.

The discriminator 19 is provided with a three bit shift registor which serves to detect one set of three bits or one set of two bits of the input compressed signal and decode the run length code or the mode code. That is, the discriminator 19 serves to instruct eight kinds of operations with respect to a combination of three bits.

For example, if the three bits are a combination of 000, these bits are the run length code of the mode 1 shown in the Table 4. So, these bits E' are supplied from the discriminator 19 to the decoder 20, and the decoding device 22 delivers an instruction f' through the controller 17 to the buffer memory 15 so as to request it to transfer the three bits in succession.

The discriminator 19 detects whether the first bit of the three bits arrived at it is "0" or "1" and the three bits are read out in succession until the first bit of the three bits becomes "1" and delivered to the decoder 20. The decoder 20 serves to combine those two bits of the consecutive first bit of "0" which are a remainder of these three bits. This series of bits is added with "0" of the three bits which have been delivered beforehand to reproduce the binary run length value which is set to a counter provided for the decoder 20. This counter provided for the decoder 20 delivers a zero signal in synchronism with its counting operation to the distributor 21 until the counted value becomes zero. The distributor 21 delivers the zero signals H', L' to the memory 23 so as to be stored therein.

If the three bits are composed of a combination of 100, that is, the mode 2 consisting of white and black picture elements or composed of a combination of 101, that is, the mode 3 consisting of black and white picture elements shown in Table 4, this two bits signal of 01 or 10 is supplied from the discriminator 19 to the distributor 21 after the completion of separation of the decoder 20 has been confirmed. The distributor 21 distributes the two bits signal into the information of the first scanning line information "0" or "1" and that information of the succeeding scanning line "1" or "0" and these informations H', I' are supplied to the memory 23. After the discriminator 19 has delivered the two bits signal 01 or 10 to the distributor 21, the buffer memory 15 serves to read out the three bits in succession.

If the three bits are composed of, for example, 111, such three bits are judged as the mode 4 shown in Table 4 since the first and second bits are "1", respectively. After the signal 11 has been delivered from the discriminator 19 to the distributor 21, the buffer memory 15 reads out the two bits in succession. A three bits shift register provided for the discriminator 19 stores the information so as to determine the mode.

If the controller 17 delivers a transfer instruction h' to the memory 23 after the controller 17 has received an instruction g' from the decoder 18, that its decoding operation has been completed, the memory 23 serves to deliver the estimated picture image information of the succeeding two scanning lines stored therein in the order from the head picture element of the estimated picture image information of the preceding scanning line. On the one hand, since the scanned picture image information decoded by the decoder 18 is accumulated in the shift register 26 for accumulating the picture elements of the first scanning line, each picture element a', b', c', d' of the decoded picture image information of the first scanning line accumulated in the shift register 26 causes the estimation circuit 27 to effect its estimating operation and supply the estimated signal M' to the comparator 24. The comparator 24 compares the one picture element signal supplied from the memory 23 with the estimated signal in an excessive logic sum manner to deliver a decoded scanned picture image signal L' to the gate 25.

The gate 25 is controlled by a control signal j' from the controller 17 to deliver an output signal N' to a recording device (not shown). The gate 25 also serves to deliver an output signal P' to the shift register 26 and store it therein as a next data to be estimated.

The receiving device shown in FIG. 4 can repeat the above mentioned operations to receive the signal shown in FIG. 2C and decode it into the series of codes shown in FIG. 2A.

The use of different synchronizing codes ensures a distinction between the series of codes ⓐ" and the series of codes ⓑ" shown in FIG. 2C and provides the advantage that even though a combination of the series of codes ⓐ", ⓑ" is subjected to noise and the like produced in the transmission path and becomes erroneous, it is possible to prevent propagation of such an error outside the above combination ⓐ", ⓑ".

Alternatively, each series of codes ⓐ" or ⓑ" shown in FIG. 2C is continuously transferred in succession and after the series of codes ⓑ" has been transferred, the synchronizing code is inserted so as to separate the set of combinations of the series of codes ⓐ" ⓑ" from each other, thereby preventing phase displacement. This process is capable of checking the total sum of the number of picture elements of the scanning line information at the receiver side every three scanning lines unit which is the combination of the series of codes ⓐ" ⓑ", of distinguishing the series of codes ⓐ" from the series of codes ⓑ", and at the same time detecting error of codes in the three scanning lines.

In Table 5 are shown compression ratios obtained by each compression system when the overall surface of an original picture of A4 size is scanned by means of a scanner whose scanning line density is 8/mm and quantization density is 9/mm.

Table 5

| Kind of original picture | Estimation function | Estimation system Compression ratio | System 1 according to the invention One set of three scanning lines Compression ratio | System 2 according to the invention One set of four scanning lines Compression ratio |
| --- | --- | --- | --- | --- |
| 1 | 1 | 4.8 | 5.0 | 4.9 |
|   | 2 | 3.5 | 4.5 | 4.5 |
| 2 | 1 | 5.4 | 5.8 | 5.8 |
|   | 2 |     | 5.6 | 5.6 |
| 3 | 1 | 8.9 | 9.7 | 10.5 |
|   | 2 |     | 9.1 | 9.8 |
| 4 | 1 | 10.8 | 12.6 | 14.0 |
|   | 2 |     | 11.6 | 12.8 |
| 5 | 1 | 6.9 | 7.6 | 8.8 |
|   | 2 |     | 7.4 | 8.4 |
| 6 | 1 | 5.0 | 5.5 | 5.9 |
|   | 2 |     | 4.3 | 4.4 |

Kind of Original Picture:
 1. Closely Spaced English Article.
 2. Closely Spaced Japanese Article.
 3. Typed English Letter.

4. Separately Spaced Japanese Letter.
5. Graph.
6. Facsimile Test Chart.

Estimation Function:
1. Estimation function determined by probability of appearance (refer to Table 1).
2. Estimation function for emphasizing points of changing from white to black and from black to white. When the picture element $d$ shown in FIG. 1 is "0", the estimated value $e$ is "0". When the picture element $d$ shown in FIG. 1 is "1", the estimated value $e$ is "1".

In the above Table 5, the compression ratio is one of the means of judging compression devices and is determined as follows.

Compression ratio =
$$\frac{\text{Total number of picture elements of scanned information}}{\text{Number of bits delivered}}$$

where each system makes use of the synchronizing code composed of 20 bits. As the original pictures, use was made of six different kinds of original pictures, that is, a closely spaced English article 1, a closely spaced Japanese article 2, an English letter type 3, a separately spaced Japanese letter 4, 5 graph 5 and facsimile test chart 6 for the purpose of measuring the compression ratio.

As the compression system, use was made of the following three systems so as to simulate the compression ratio.

1. Four picture elements two dimensional estimation system.

If the estimated picture image information obtained after estimation treatment which makes use of the estimation function is a "1" signal, a run length code mainly consisting of "1" shown in the Table 4 is transmitted, and a "0" signal is translated into codes by means of the two bits division coded system.

2. System 1 according to the present invention.
A system of delivering one set of three scanning lines as explained with reference to FIG. 2.

3. System 2 according to the present invention.
A system of delivering one set of four scanning lines. That is, the first scanning line of one set of four scanning lines is translated into codes by means of the run length code shown in the Tables 2 and 3. The second, third and fourth succeeding scanning lines are subjected to the estimation treatment and then allotted the mode code by means of the three bits information in the auxiliary running direction in the same manner as the system 1 according to the invention. At the same time, these three scanning lines are translated into codes and then these codes are transmitted.

Two kinds of the estimation functions were used.
Function 1: The function shown in the Table 1 and determined by the appearance probability.
Function 2: The estimation function determined by the picture element correlated probability.

The estimation function in which when the picture element $d$ shown in the Table 1 is "0", the estimated value $e$ is "0", and when the picture element $d$ is "1", the estimated value $e$ is "1".

As a result, the four picture elements $a, b, c, d$ are not estimated, but only one picture element $d$ is estimated. That is, this estimation function serves to find out points where the scanned picture image information changes from white to black and black to white.

Figure 5:
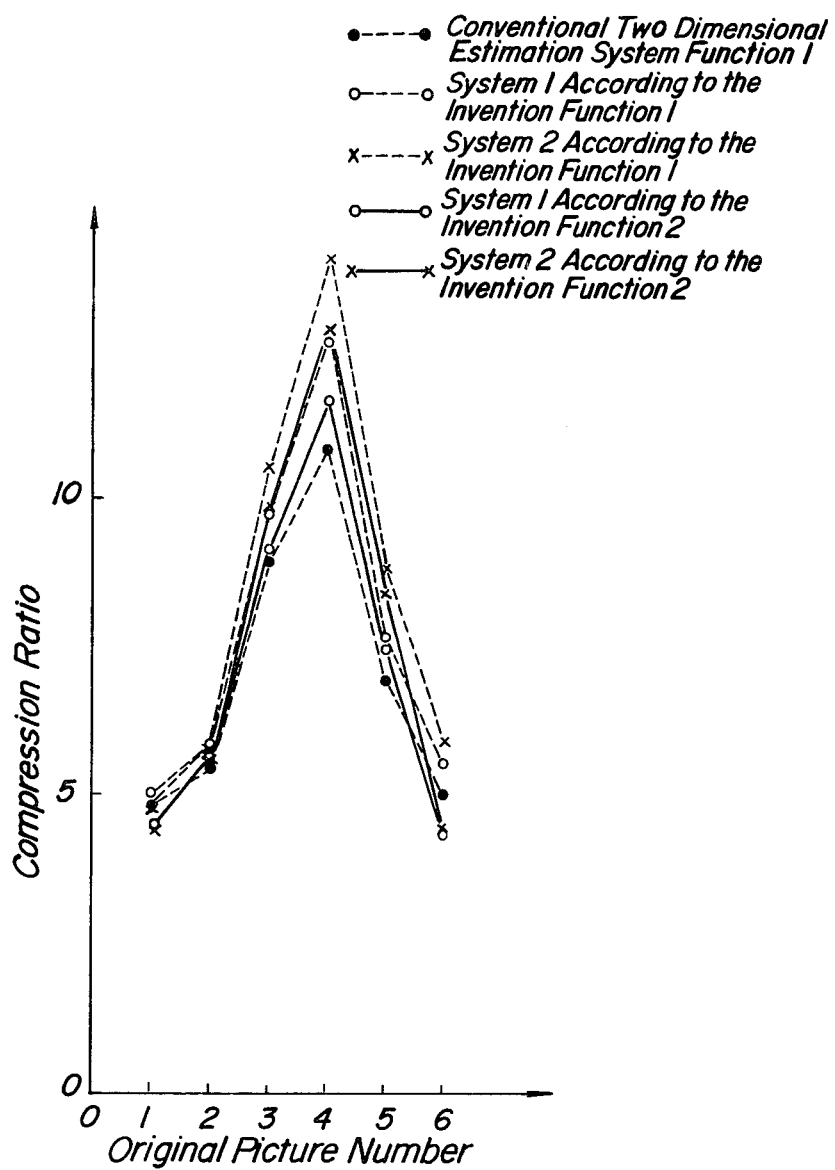
FIG. 5 are graphs that are used in comparing the compression ratio of the band compression and transmission system according to the invention with the compression ratio of the conventional band compression and transmission system.

In FIG. 5 are shown graphs showing a relation between the kind of original pictures taken on the abscissa and the compression ratio taken on the ordinate.

As seen from FIG. 5, both the systems 1, 2 according to the invention can improve the compression ratio if compared with the conventional two dimensional estimation system. Particularly, with respect to the original picture 4, i.e. the separately spaced Japanese letter, the system 1 according to the invention can improve the compression ratio on the order of 17%, and the system 2 according to the invention can improve the compression ratio on the order of 30%. This is due to the fact that the original pictures are separately spaced apart from each other and hence that space of the total original picture which is occupied by white is large as compared with black and that the correlation becomes strong in the auxiliary scanning direction. Thus, the system according to the invention which can translate one set of several scanning lines into codes is capable of significantly improving the compression ratio.

By comparing the function 1 with the function 2, it is possible to judge that the function 1, i.e. the four picture elements estimation function determined by the appearance probability is better than the function 2. Particularly, with respect to the closely spaced original picture, the function 1 can improve the compression ratio by at least 10% if compared with the function 2. With respect to the original pictures, such as the facsimile test chart, which is closely spaced at random, the function 1 can improve the compression ratio on the order of 30%, if compared with the function 2.

With respect to the systems 1, 2 according to the invention, the system 2 is more effective than the system 1 particularly for the separately spaced original pictures. It is a matter of course that the system 2 is less effective for the closely spaced original picture.

As stated hereinbefore, the system according to the invention can improve the compression ratio by on the order of 10% if compared with the conventional two dimensional estimation system, and can also obviate such undesirous phenomena which has been encountered with the conventional two dimensional estimation system, i.e. the phenomenon in which pulse error produced due to noise and the like in the transmission path is propagated from one scanning line into another scanning lines.

For the sake of completeness, the circuit elements shown by blocks in FIG. 3 will now be described with reference to FIGS. 6 to 14.

Figure 6:
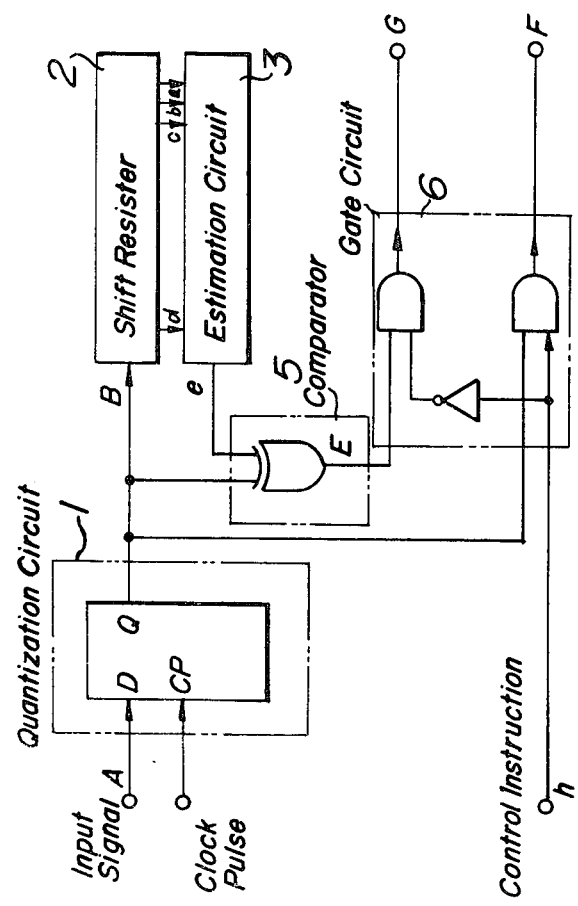

In FIG. 6 there is shown one example of the quantization circuit 1, comparator 5 and gate circuit 6 shown in FIG. 3, respectively.

Figure 7:
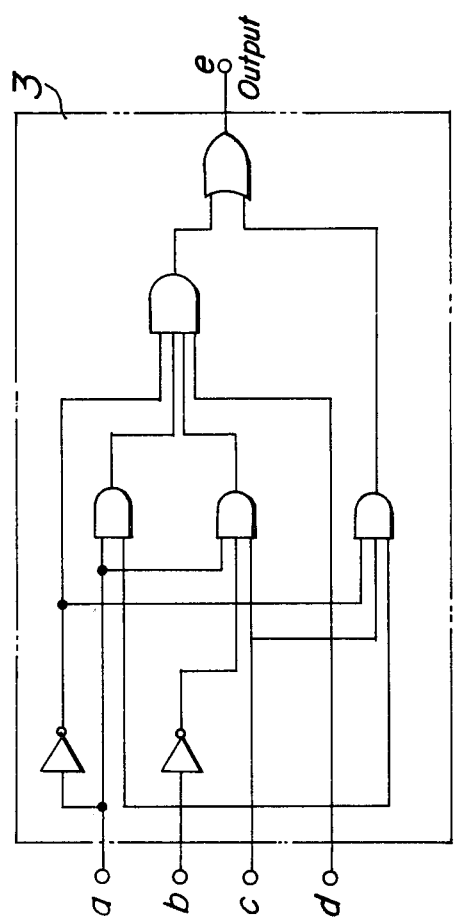

In FIG. 7 there is shown one example of the estimation circuit 3 shown in FIG. 3.

In FIG. 8 there is shown one example of the controller 4 shown in FIG. 3.

Figure 9:
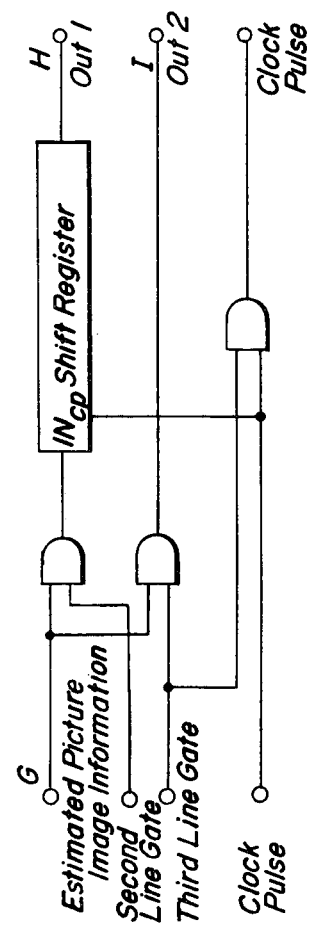

In FIG. 9 there is shown one example of the shift register 7 shown in FIG. 3.

Figure 10:
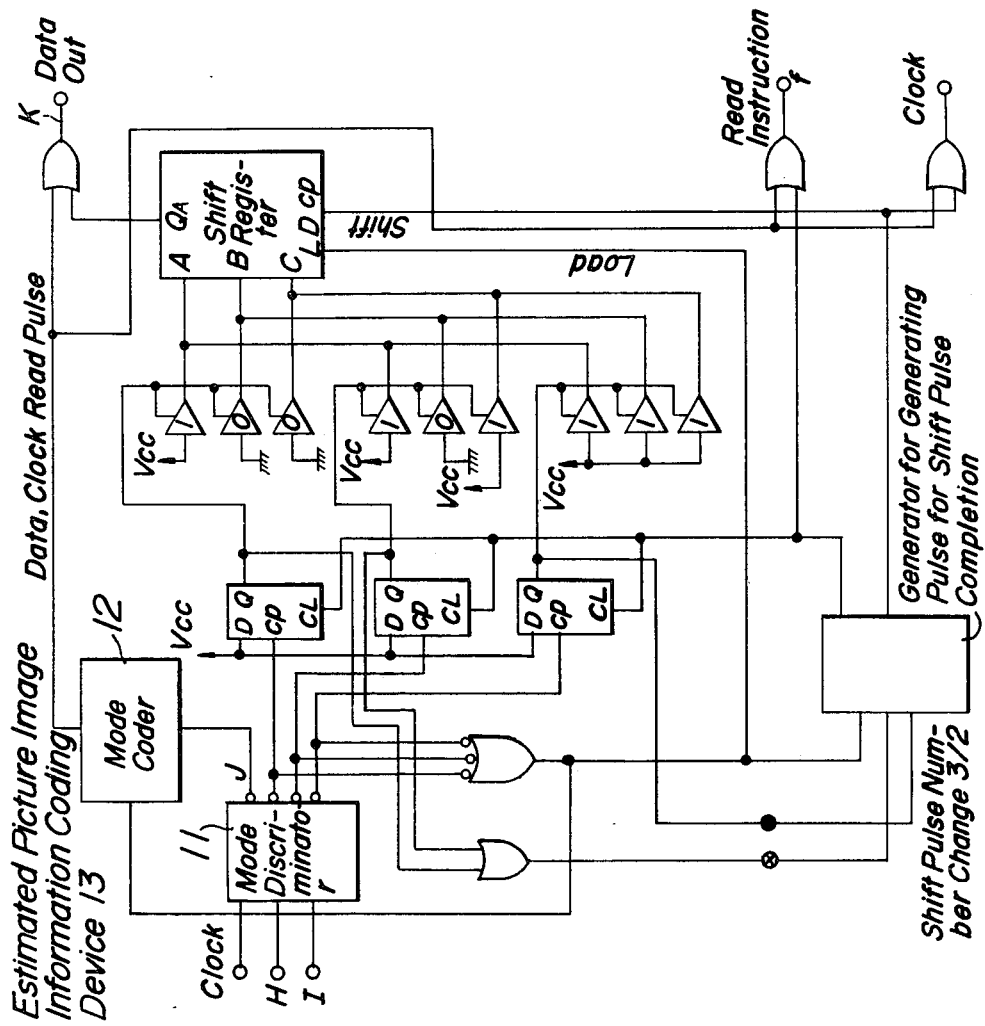
Figure 11:
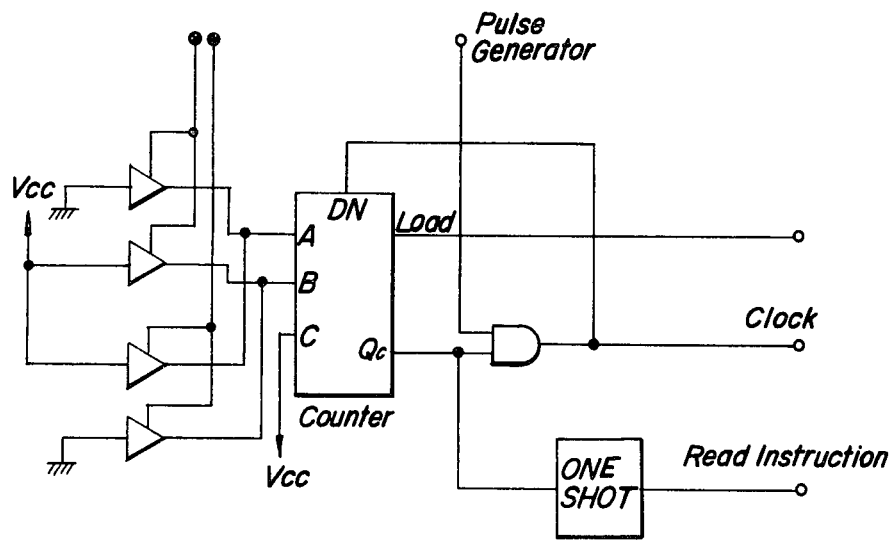

In FIG. 10 there is shown one example of the estimated picture image information coding device 13 inclusive of the mode discriminator 11 and the mode coder 12 shown in FIG. 3 and a generator for generating a pulse for shift pulse completion whose details are shown in FIG. 11.

Figure 12:
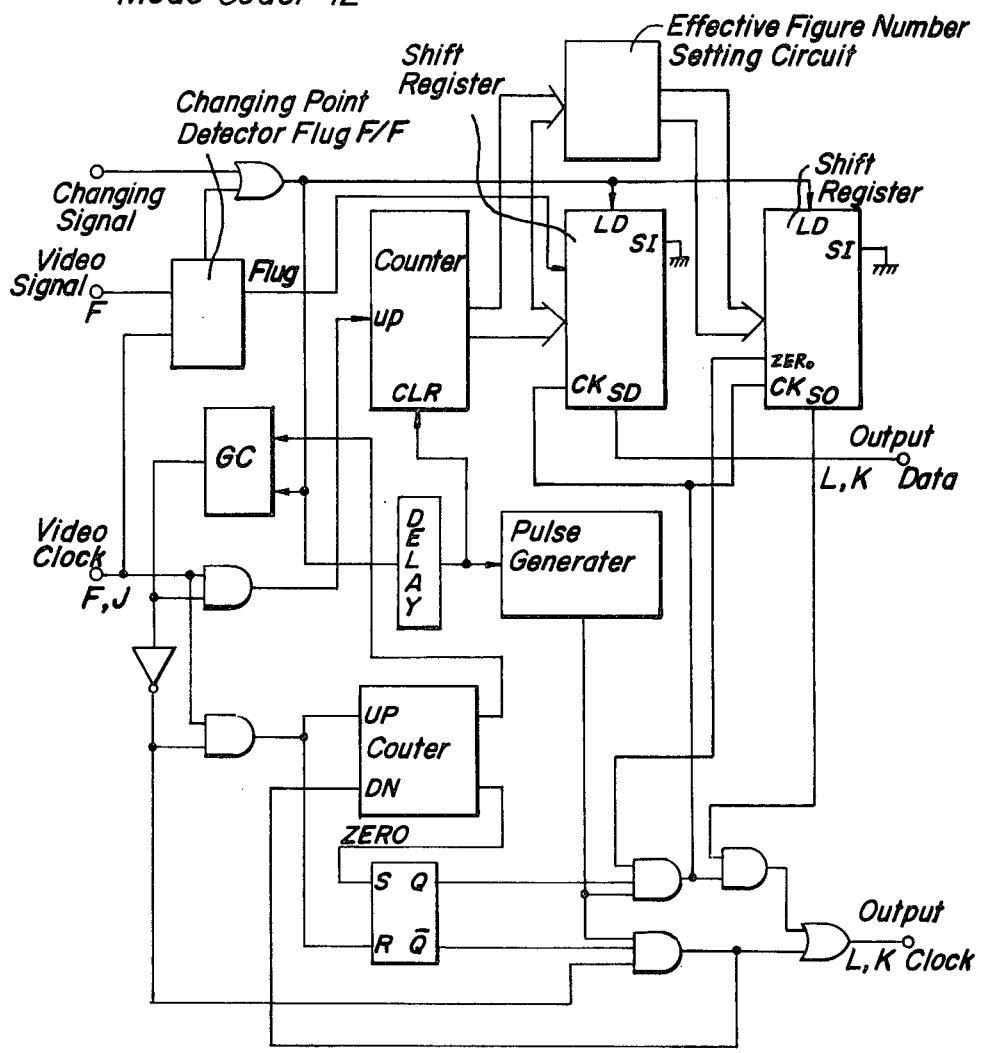
Figure 13:
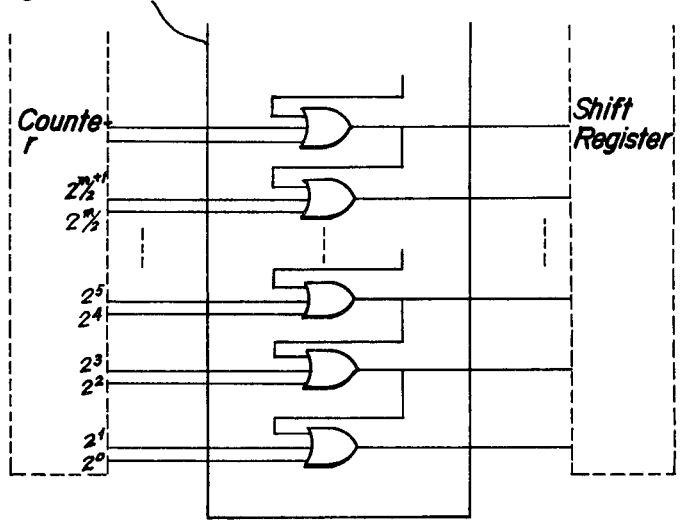
Figure 14:
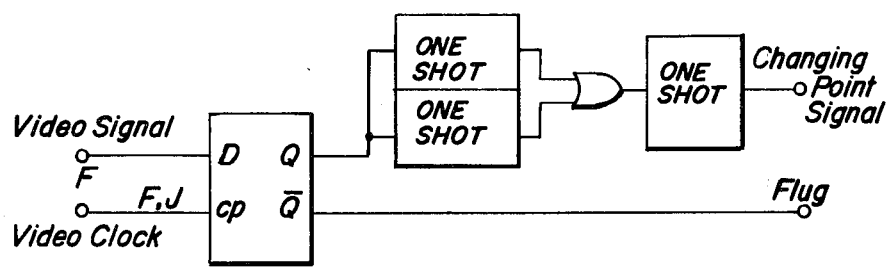

In FIG. 12 there is shown one example of the run length coder 8 of the estimated reference information coding device 10 shown in FIG. 3, which is the same in construction and circuit arrangement as the mode coder 12 of the estimated picture image information coding device 13 shown in FIG. 3. Both the run length coder 8 and the mode coder 12 shown in FIG. 12 includes an effective figure number setting circuit the details of which are shown in FIG. 13, and a changing point detector F/F the details of which are shown in FIG. 14.

The operation of the above described circuit elements is understood by the above described operation of the transmitting device shown in FIG. 3.

The circuit elements shown by blocks in FIG. 4 are opposite in principle to those shown in FIGS. 6 to 14, so that those circuit elements are omitted.

What is claimed is:

1. A picture image information band compression and transmission process, comprising the steps of providing one set of three scanning lines ⓐⓑⓒ, making information of the first scanning line ⓐ of each one set ⓐⓑⓒ as an estimation scanning line, estimating a picture element $e$ to be estimated by four consecutive picture elements $a, b, c, d$ and preparing estimated picture image informations ⓑ', ⓒ' and translating estimated picture image information ⓐ' showing as an estimation reference scanning line and both two estimated picture image information into run length codes cⓐ" and into a mode code cⓑ", respectively, and compressing and transmitting said run length codes cⓐ" and cⓑ".

2. A picture image information band compression and transmission process as claimed in claim 1, wherein "white" and "black" information are predetermined as "0" and "1" information signals, codes are given by continuous information signals 0, 00, 000 in Table 2 or 1, 11, 111 in Table 3 up to a given number 3 of run length, at those numbers of run length which are larger than said given number 3 of run length, values from which is subtracted "said given number 3 of run length plus 1" is translated into a binary code and divided into a given number of bits (2 bits), information signals corresponding to said white and black information are added to the top of each said divided unit, and said translation into run length code is effected by adding bits representing said given number (3) of the run length to the top of the code.

3. A picture image information band compression and transmission process as claimed in claim 1, wherein said estimated picture image information ⓑ', ⓒ' of said plurality of scanning lines ⓑ, ⓒ are translated into a mode code with respect to rows of picture elements adjacent to the auxiliary scanning direction, and said plurality of scanning lines of said estimated picture image information ⓑ', ⓒ' are translated into one row of transmitting codes cⓑ".

4. A picture image information band compression and transmission process as claimed in claim 1, wherein rows
    of said four consecutive picture elements $a, b, c, d$ adjacent to said picture element $e$ to be estimated are provided by picture elements $a, b, c$ belonging to a first scanning line
    immediately preceding a second scanning line including said picture element $e$ to be estimated and adjacent to said picture element $e$ to be estimated and by a picture element $d$ immediately preceding said picture element $e$ to be estimated and then estimated values corresponding to each said four consecutive picture elements $a, b, c, d$ adjacent to said picture element $e$ to be estimated are compared with an input value of said picture element $e$ to be estimated to determine each picture element of correctly estimated picture image information.

5. A picture image information band compression and transmission process as claimed in claim 4, wherein picture elements $a, d$ or $c$ corresponding to each picture element constituting said rows of picture elements $a, b, c$ and $d, e$ adjacent to said picture element $e$ to be estimated are absent, said rows of picture elements $a, b, c$ and $d, e$ are provided by inserting an assumed picture element 0 or 1 for example.

6. A picture image information band compression and transmission process for selecting and processing digital picture elements occurring in a picture area of at least first, second and third successive scanning lines, said picture elements being aligned in columns along said picture area, comprising the steps of:
    selecting three consecutive adjacent picture elements in said first scanning line, said three consecutive adjacent picture elements being disposed in first, second and third columns;
    selecting a fourth picture element in said second scanning line, said fourth picture element being disposed in said first column;
    estimating a picture element adjacent to said fourth picture element in a direction of scanning by selecting an estimated parameter in dependence of a predetermined consecutive combination of said first, second, third and fourth picture elements;
    comparing the estimated picture element with an actual picture element adjacent to said fourth picture element in the direction of scanning; and
    determining coincidence or non-coincidence of said estimated picture element with said actual picture element, allotting a "zero" to coincidence, and a "one" to lack of coincidence, the consecutively determined coincidence or non-coincidence becoming an estimated reference information scanning line.

7. A picture image information band compression and transmission process according to claim 6, wherein each of said picture elements has a value of zero or one, corresponding to a white or black information signal, respectively, wherein a series of up to three consecutive zero or one value picture elements is denoted by a corresponding number of zero's or one's, respectively.

8. A picture image information band compression and transmission system according to claim 6, and wherein in the absence of one of said first, second, third and fourth picture elements a picture element of an assumed value is insertable.

9. A picture image information band compression and transmission process according to claim 6, wherein each of said picture elements has a value of zero or one, corresponding to a white or black information signal, respectively, and wherein a series of at least four consecutive zero or one value picture elements has the decimal number four subtracted therefrom, the remaining decimal number being coded into a binary code, said binary code being divisible into groups of two consecutive binary digits, each of said consecutive binary digits being preceded by a zero or one, respectively, in dependence of white and black picture information, each of said binary codes being preceded by three binary digits, having the value of zero and one, in dependence of white or black picture information, respectively.

10. A picture image information band compression and transmission process as claimed in claim 6, further comprising first and second successive estimated reference information scanning lines having picture elements aligned in columns, and wherein a run length code of "zero's" corresponds to first and second respective zero's in a column, a one-zero-zero code corresponds to a succession of a "zero" and a "one" picture element from the first to the second scanning line, a "one-zero-one" code corresponds to a succession of a "one" and a "zero" picture element from the first to the second scanning line, and wherein a "one-one" code corresponds to a succession of two "one" elements, said first and second successive estimated reference information scanning lines being transmittable in a single scanning line by a succession of said codes.

* * * * *